United States Patent [19]

Wakabayashi

[11] 4,275,855
[45] Jun. 30, 1981

[54] FILM TAKE-UP SPOOL

[75] Inventor: Hiroshi Wakabayashi, Yokohama, Japan

[73] Assignee: Nippon Kogaku K.K., Tokyo, Japan

[21] Appl. No.: 148,270

[22] Filed: May 9, 1980

[30] Foreign Application Priority Data

May 24, 1979 [JP] Japan .............................. 54-68805[U]
Jul. 27, 1979 [JP] Japan ............................ 54-104019[U]

[51] Int. Cl.³ .......................... G03B 1/04; B65H 75/28
[52] U.S. Cl. ..................................... 242/71.2; 242/74
[58] Field of Search ................. 242/74, 71, 71.1, 71.2,
242/71.3, 71.4, 71.5, 71.8, ; 354/171, 173, 212

[56] References Cited

U.S. PATENT DOCUMENTS

| 1,996,782 | 4/1935  | Wood ........................................ 242/74 |
| 2,379,690 | 7/1945  | Cunningham ........................ 242/71.2 |
| 3,429,245 | 2/1969  | Novak .............................. 242/71.2 X |
| 3,484,053 | 12/1969 | Rehn ..................................... 242/71.2 |

Primary Examiner—Edward J. McCarthy
Attorney, Agent, or Firm—Fitzpatrick, Cella, Harper & Scinto

[57] ABSTRACT

A film take-up spool is constructed with the pitch of the pawls thereof determined so as to be longer than the pitch of the perforations of film on condition that, in at least the first round of the film wound around the take-up spool, the perforations of the film shall be completely engaged with corresponding pawls.

6 Claims, 10 Drawing Figures

FILM TAKE-UP SPOOL

BACKGROUND OF THE INVENTION

1. Field of the Invention

This invention relates to a film take-up spool of a camera, and more particularly to a film take-up spool suited for a camera having an automatic film threading mechanism.

2. Description of the Prior Art

There are already commercially available cameras having a mechanism in which a plurality of pawls engageable with the perforations of film are provided on a film take-up spool to permit the film loaded into the camera to be easily twined around the take-up spool and when the spool has been rotated by film take-up means, said pawls engage the perforations to cause the film to twine around the spool. As shown in FIG. 2 of the accompanying drawings, the pitch P of the pawls 1a, 1b, ... of the spool 1 in the conventional camera of this type is equal to the pitch Po of the perforations 2a, 2b, ... of film 2 shown in FIG. 1 of the accompanying drawings. Therefore, due to the manufacturing error of the pitch Po of the perforations of the film or the pitch P of the pawls of the spool or to the resilient distortion of the film caused when the pawl 1a engages the perforation 2a, the pitch P of the pawls of the spool becomes shorter than the pitch Po of the perforations and accordingly, as shown in FIG. 2, when the first perforation 2a is engaged with the pawl 1a, the second perforation 2b is not engaged with the pawl 1b but the film 2 rides on the pawl. If the first engagement is broken under the influence of the resiliency of the film when the spool 1 has been further rotated in such state, the film would become disengaged from the spool because the second engagement is not accomplished.

SUMMARY OF THE INVENTION

It is the object of the present invention to provide a film take-up spool which ensures that the film perforations engage the pawls of the film take-up spool.

To achieve such object, the invention is constructed as follows. That is, on condition that, in at least the first round of the film wound around the take-up spool, the perforations of the film shall be completely engaged with corresponding pawls, the pitch P of the pawls of the take-up spool is determined so as to be longer than the pitch Po of the perforations of the film.

The invention will become fully apparent from the following detailed description thereof taken in conjunction with the accompanying drawings.

DESCRIPTION OF THE PREFERRED EMBODIMENTS

Reference is first had to FIGS. 3 to 6 to describe a first embodiment of the present invention.

Figure 1:
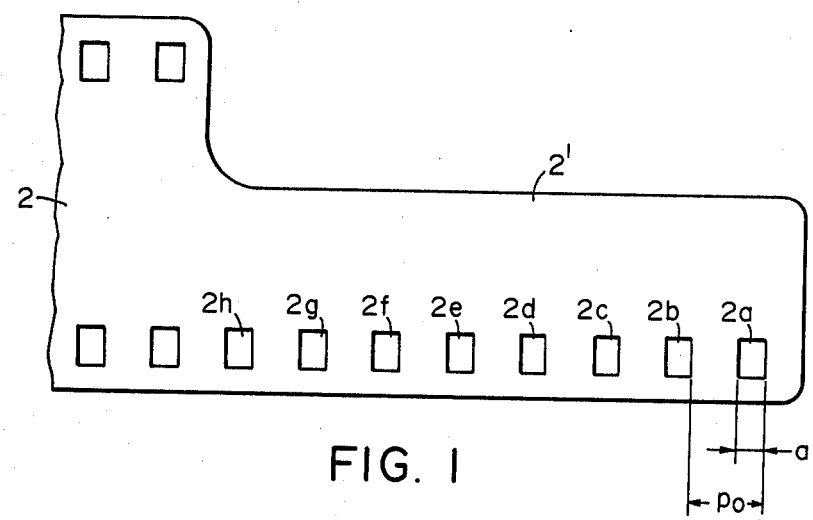
FIG. 1 shows the leader portion of an ordinary roll film.
Figure 2:
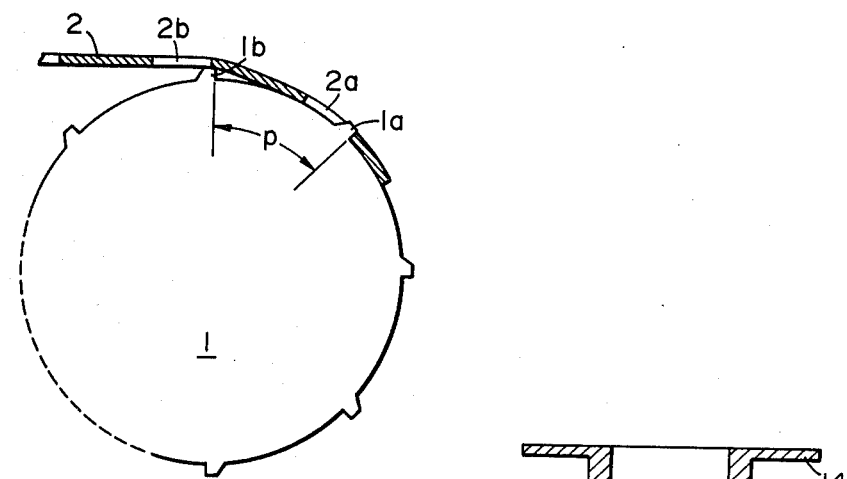
FIG. 2 shows the relation between the perforations of the film and the pawls of the take-up spool according to the prior art.
Figure 3:
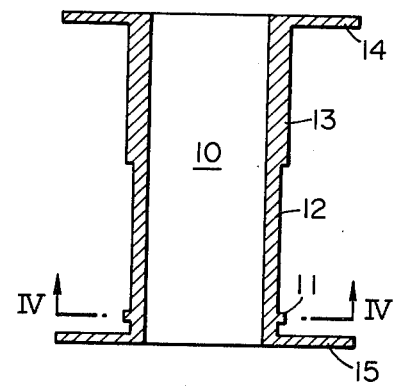
FIG. 3 is a vertical cross-sectional view of the take-up spool according to a first embodiment of the present invention.
Figure 4:
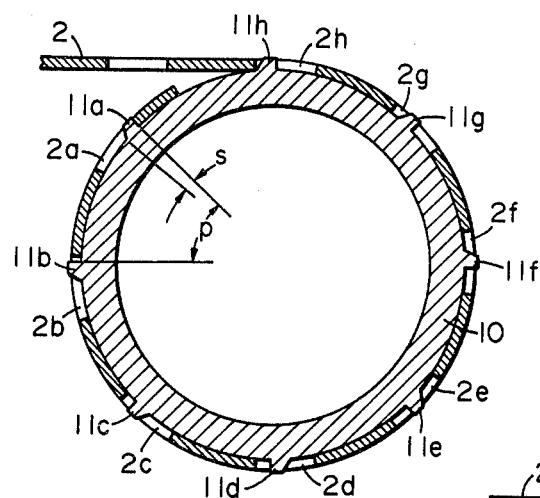
FIG. 4 is an enlarged cross-sectional view taken along the line IV—IV of FIG. 3.

FIG. 3 is a vertical cross-sectional view of the film take-up spool according to the first embodiment of the present invention, and FIG. 4 is an enlarged cross-sectional view taken along the line IV—IV of FIG. 3.

The pawls 11 of the take-up spool 10 are provided on the same circumference of the take-up spool body. As shown in FIG. 3, a leader portion twining section 12 around which the leader portion 2' of film usually formed at the leading end of the film may be twined is smaller in radius than a twining section 13 around which the film body portion for exposure may be twined. This difference in radius is substantially equal to the thickness of the entire film leader portion when twined around the leader portion twining section 12. Flanges 14 and 15 for preventing lateral displacement of the film are formed at the opposite ends of the take-up spool.

Figure 5:
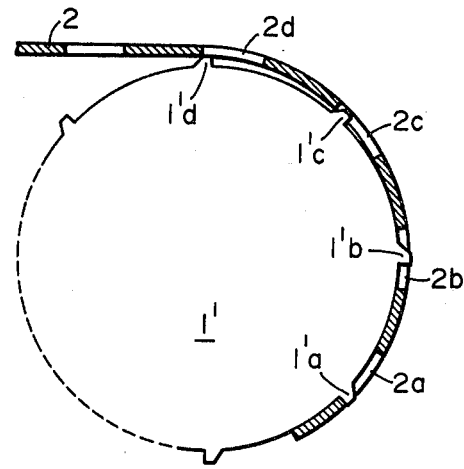
FIG. 5 illustrates an inconvenience in the engagement between the perforations of the film and the take-up spool.

The pitch P of the pawls 11 of the take-up spool is determined so as to be longer than the perforation pitch Po of the film. However, too long a pitch would case an inconvenience as hereinafter described. In FIG. 5, when the first perforation 2a of the film leader portion engages the pawl 1'a of the spool 1', the succeeding pawls 1'b and 1'c completely engage the succeeding perforations 2b and 2c, respectively, whereas for example, the fourth pawl 1'd does not engage the fourth perforation 2d but the film leader portion rides on the pawl 1'd. Thereafter, when the film is further advanced unitl the film body portion is twined around the spool 1', that portion of the film body which has twined around the outside of the portion in which the perforations have completely engaged the pawls is wound flatly, whereas a step is created in that portion of the film body which has twined around the portion in which the perforation does not engage the pawl but has ridden on the pawl as described above, thus causing unsatisfactory winding of the film.

To avoid such a situation, the pitch and width of the pawls are determined so as to satisfy the following predetermined condition:

$$S + N(P - Po) \leq a \tag{1}$$

where S is the circumferential width of the spool at the root of each pawl as shown in FIG. 4, N is the number of perforations present in the length of film corresponding to the outer periphery of the leader portion twining section 12 of the spool and accordingly, $N(P - Po)$ is the total of the pitch differences between the Nth pawl and perforation as counted from the leading end of the film, and a is the width of each perforation in the lengthwise direction of the film.

This formula (1) has been obtained in the following manner. In FIG. 4, when the first perforation 2a of the leader portion 2' is in engagement with the pawl 11a, the pawl 11a is positioned at one end of the perforation 2a. Since the pitch P of the pawls is greater than the perforation pitch Po, the second perforation 2b and pawl 11b engage each other in a state that the pawl 11b is spaced apart from one end of the perforation 2b by an amount corresponding to P−Po. In the relative positional relation between the succeeding perforations and pawls, the pawls are spaced apart from one end of the perforations they engage, by an amount corresponding to the total pitch difference therebetween. When the film has made one round of the spool, the perforation 2h corresponding to the last pawl 11h must also completely engage the pawl 11h. Accordingly, if it is assumed that this last perforation 2h is the limit one which engages the pawl, the pawl 11h is positioned in contact with the other end of the perforation 2h, as shown in FIG. 4. Thus, as is apparent also from FIG. 4, $$a = S + N(P - Po)$$

If design is made such that several perforations can engage the pawls even in the second round, $$a \geq S + N(P - Po)$$

Generally, in commercially available 35 mm size roll film, eight perforations are provided in the leader portion thereof. Accordingly, if the number of pawls of the take-up spool is eight, it is possible to cause all of the perforations in the leader portion always to engage the pawls and further, if the height of the pawls from the outer periphery of the spool is made substantially coincident with the outer periphery of the twining section 13 around which the film body portion for exposure may be twined, the film body portion will always be wound flatly on the spool without being wound unsatisfactorily.

An example of the take-up spool which satisfies such conditions will now be shown. In ordinary film, the perforation pitch Po=4.75 mm, the perforation width a=1.98 mm, and as described above, the number of perforations in the leader portion is eight. Let the number of pawls N1 of the take-up spool be 14, the pawl width S be 1.2 mm and the number of perforations N engaging the pawls be 14.

From formula (1), the difference between the pawl pitch and the perforation pitch is P−Po=0.0557 mm. Accordingly, the pitch of the pawls becomes P=4.8057 mm.

Also, PN1=πD (D is the diameter of the take-up spool at the location thereof whereat the pawls are provided) and therefore, the take-up spool diameter D=21.4 mm.

Figure 6:
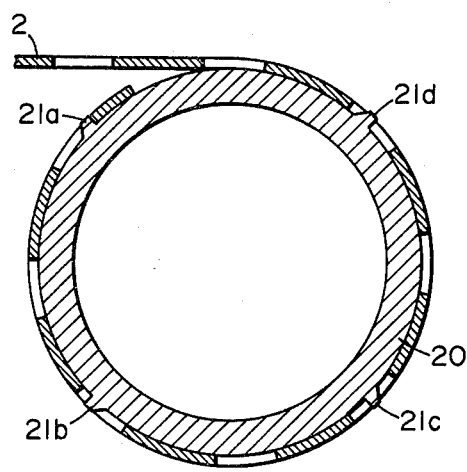
FIG. 6 is a cross-sectional view showing a second embodiment of the present invention.

In the first embodiment of the present invention shown in FIG. 4, the number of pawls is set so that the pawls engage all of the perforations in that portion of the film which has made the first round, but not all of the perforations need always engage the pawls. FIG. 6 shows an example in which pawls 21a–21d are provided for every other perforation, and in this case, the aforementioned formula (1) is rewritten into:

$$S + N(P/2 - Po) \leq a \quad (2)$$

Accordingly, if it is considered that pawls are provided for every several perforations, formula (2) can generally be expressed as $$S + N(P/n - Po) \leq a \quad (n \text{ is an integer})$$

Reference is now had to FIGS. 7 to 10 to describe an embodiment which will be useful when the take-up spool of the present invention described in connection with the second embodiment is actually applied to a camera having an automatic film threading mechanism.

In this embodiment, the pawls of the take-up spool according to the present invention are formed integrally with the case of a motor M.

In cameras wherein film is automatically advanced by a motor drive, it is already known to have the motor contained in the film take-up spool or to use the case of the motor as the spool, thereby economizing the space. For example, Japanese Laid-open Utility Model Application No. 157727/1978 discloses a technique whereby a cylinder is put on the outside of a motor fixed to a camera body, with the cylinder being provided with a groove for nipping the leading end of film, and the rotation of the motor is transmitted to the cylinder through a gear train so that the film having its leading end nipped by the groove is taken up onto the cylinder by the rotation of the latter. However, this technique has a disadvantage that a space corresponding to the thickness of the cylinder is excessively required and therefore, the film wind-up chamber of the camera must be made large.

The present embodiment also solves such a disadvantage peculiar to the prior art.

Figure 7:
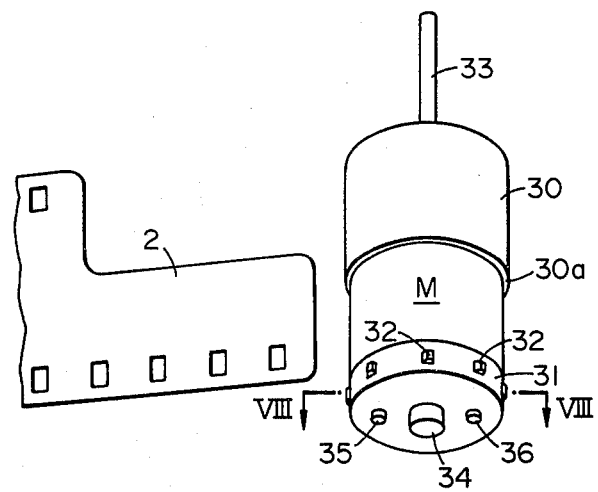
FIG. 7 is a perspective view showing a third embodiment of the present invention.

In FIG. 7, the motor M has, as its case, a container 30 formed of plastics, for example, and holding a permanent magnet therein, and a cap 31 formed of plastics, for example, and providing the lid of the container and holding a brush or the like therein.

This container 30 or cap 31 is formed with a plurality of integral pawls 32 on the same conditions as in the previously described first embodiment (in FIG. 7, the cap is formed with such pawls 32). A rotary shaft 33 which is the output stage of the motor M is unrotatably fixed to the camera body. On the other hand, a rotary shaft 34 integrally formed with the cap 31 is rotatably supported on the camera body. Thus, when power is supplied from terminals 35 and 36 to the motor M, the case is rotated. If the film 2 is then placed on the case, the pawls 32 engage the perforations of the film 2 to cause the film to twine around the case. In this manner, the film is taken up.

A stepped portion 30a provided on the container 30 is for ensuring the film to be taken up flatly with respect to the case and the height of the stepped portion 30a is equal to the height of the pawls 32. The leader portion of the film twines around the reduced diameter portion of the case (the diameter of the cap 31 corresponds to that of this portion).

Figure 8:
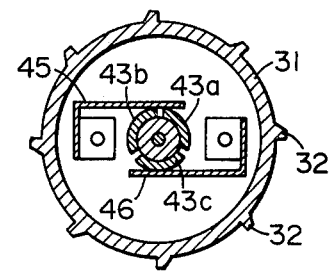
FIG. 8 is a cross-sectional view taken along the line VIII—VIII of FIG. 7.
Figure 9:
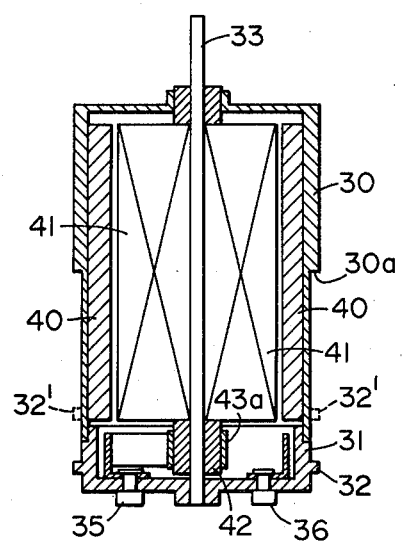
FIG. 9 is a vertical cross-sectional view of FIG. 7.

Reference is now had to FIGS. 8 and 9 to describe the construction of the motor M which is known per se. A permanent magnet 40 for generating field magnetism is fixed to the circumference of the container 30. The cap 31 of insulative synthetic resin provides the lid of the container 30 and hermetically seals the container. The rotary shaft 33 which is the output stage of the motor M is journalled to the container 30 and cap 31. A coil 41 is wound on the shaft 33. Also, three armatures 43a, 43b and 43c connected to the lead wire of the coil 41 are secured to the shaft 33 with an insulator 42 interposed therebetween. Brushes 45 and 46 connected to a pair of terminals 35 and 36, respectively, are in contact with these armatures, and the armatures and brushes dispense to the coil 41 the power supplied from the terminals 35 and 36.

Pawls 32 are integrally formed with the cap 31. Pawls 32' indicated by dotted line are pawls integrally formed with the container 30.

Figure 10:
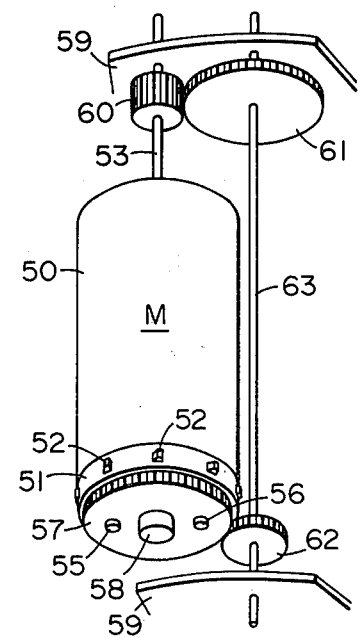
FIG. 10 is a perspective view showing a fourth embodiment of the present invention.

FIG. 10 shows still another embodiment of the present invention. A plurality of pawls 52 are integrally formed with the cap 51 of the motor M on the same conditions as in the first embodiment. Further, a case rotating gear 57 is integrally formed with the cap 51. A rotary shaft 58 integrally formed with the gear 57 is rotatably supported on the camera body 59. Alternatively, the gear 57 may be formed on a container 50. A rotary shaft 53 which is the output stage of the motor M is rotatably supported on the camera body 59.

Rotation of the shaft 53 is transmitted to the gear 57 through gears 60–42. The rotary shaft 63 of the gears 61 and 62 is rotatably supported on the camera body 59.

With the above-described construction, when power is supplied from terminals 55 and 56 to the motor M, rotation of the shaft 53 is transmitted to the gear 57 through gears 60–62. At this time, since the shafts 53, 58 and 63 are supported on the camera body 59 as previously described, the gear 57 and the case are rotated about the shaft 58, thus acting as a film take-up spool.

I claim:

1. In a film take-up spool of a camera disposed within the camera body and rotatable to wind thereon a film having perforations, the improvement comprising:
a plurality of pawls projectedly provided on the outer periphery of said spool so as to be engageable with said perforations, each of said pawls being provided at a location corresponding to a respective perforation when the film has been wound on said spool, said pawls being provided so as to satisfy the following relations:
$P > Po$ and $S + N(P/n - Po) \leq a$ (n is an integer) where S is the width of said pawl in the circumferential direction of said spool, P is the pitch between the pawls, a is the width of each said perforation in the lengthwise direction of the film, Po is the pitch between said perforations, and N is the number of perforations present in the length of the film corresponding to the outer periphery of said spool.

2. The film take-up spool according to claim 1, wherein the number of said pawls is equal to the number N of the perforations present in the length of the film corresponding to the outer periphery of said spool.

3. In a film take-up spool of a camera disposed within the camera body and rotatable to wind thereon a film having perforations, said spool containing therewithin a motor for driving said spool, the improvement comprising:
a plurality of pawls projectedly provided on the outer periphery of said spool so as to be engageable with said perforations, each of said pawls being provided at a location corresponding to a respective perforation when the film has been wound on said spool, said pawls being provided so as to satisfy the following relations:
$P > Po$ and $S + N(P/n - Po) \leq a$ (n is an integer) where S is the width of each said pawl in the circumferential direction of said spool, P is the pitch between the pawls, a is the width of each said perforation in the lengthwise direction of the film, Po is the pitch between said perforations, and N is the number of perforations present in the length of the film corresponding to the outer periphery of said spool.

4. The film take-up spool according to claim 3, wherein said motor includes a rotatively driven cylindrical case having a coil member wound around a fixed shaft and a field magnetism generating member positioned outside of said coil member, and said pawls are provided on the outer periphery of said case.

5. The film take-up spool according to claim 4, wherein said cylindrical case includes a container to which said field magnetism generating member is secured and a cap on which said pawls are provided and which engages one end of said container.

6. The film take-up spool according to claim 4, wherein said cylindrical case includes a leader take-up portion on which said pawls are provided, a film body take-up portion thicker than said leader take-up portion, and a stepped portion formed between said leader take-up portion and said film body take-up portion and having a height substantially equal to that of said pawls.

* * * * *